(12) United States Patent
Tsuji

(10) Patent No.: US 9,621,788 B2
(45) Date of Patent: Apr. 11, 2017

(54) FOCUS CONTROL DEVICE, NON-TRANSITORY COMPUTER READABLE RECORDING MEDIUM HAVING THEREIN PROGRAM FOR FOCUS CONTROL, AND METHOD FOR FOCUS CONTROL

(71) Applicant: FUJITSU LIMITED, Kawasaki-shi, Kanagawa (JP)

(72) Inventor: Takuma Tsuji, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/932,853

(22) Filed: Nov. 4, 2015

(65) Prior Publication Data

US 2016/0156833 A1 Jun. 2, 2016

(30) Foreign Application Priority Data

Nov. 28, 2014 (JP) ................. 2014-241124

(51) Int. Cl.
*G02B 7/34* (2006.01)
*H04N 5/232* (2006.01)
(Continued)

(52) U.S. Cl.
CPC ........... *H04N 5/23212* (2013.01); *G02B 7/36* (2013.01); *G03B 7/28* (2013.01); *G03B 13/36* (2013.01);
(Continued)

(58) Field of Classification Search
CPC ...................................... G02B 7/346
(Continued)

(56) References Cited

U.S. PATENT DOCUMENTS 5,126,849 A * 6/1992 Senuma ............. H04N 5/23212
348/353
6,088,060 A 7/2000 Suda et al.
(Continued)

FOREIGN PATENT DOCUMENTS

JP 62-182704 8/1987
JP 03-261277 * 11/1991 ............. H04N 5/232
(Continued)

OTHER PUBLICATIONS

European Search Report EP15193234, Apr. 29, 2016, 8 pgs.*
Extended European Search Report of corresponding European Patent Application No. 15193234.0 dated May 10, 2016.

*Primary Examiner* — Clayton E Laballe
*Assistant Examiner* — Kevin Butler
(74) *Attorney, Agent, or Firm* — Maschoff Brennan

(57) ABSTRACT

A focus control device includes an acquisition unit that acquires image data of a plurality of first frames, each of the plurality of first frames being captured at each of positions of a lens in an optical axis direction, the positions being different each other; and a movement unit that, when a focusing position of the lens is not determined based on contrast evaluation values for an area to be focused on in the plurality of first frames, determines a direction for moving the area, based on a magnitude of a contrast evaluation value within the area and a position of an area with the contrast evaluation value larger than or equal to a given threshold in each piece of image data of the plurality of first frames or a plurality of second frames newly acquired by the acquisition unit, and moves the area in the determined direction.

7 Claims, 17 Drawing Sheets

(51) Int. Cl.
   *G02B 7/36*       (2006.01)
   *G03B 7/28*       (2006.01)
   *G03B 13/36*      (2006.01)
   *H04N 5/235*      (2006.01)
   *G06F 3/041*      (2006.01)
   *G06K 9/00*       (2006.01)

(52) U.S. Cl.
   CPC ....... *G06F 3/0412* (2013.01); *G06K 9/00624* (2013.01); *H04N 5/2351* (2013.01); *H04N 5/23293* (2013.01)

(58) Field of Classification Search
   USPC .......................................... 348/345; 396/121
   See application file for complete search history.

(56) References Cited

U.S. PATENT DOCUMENTS

| | | | |
   |---|---|---|---|
   | 6,094,223 A * | 7/2000 | Kobayashi | G02B 7/28 |
   | | | | 348/345 |
   | 2005/0128340 A1 | 6/2005 | Ikeda | |
   | 2007/0152062 A1* | 7/2007 | He | H04N 5/23212 |
   | | | | 235/462.32 |
   | 2008/0247742 A1 | 10/2008 | Asano | |
   | 2012/0147165 A1* | 6/2012 | Yoshino | H04N 5/23212 |
   | | | | 348/65 |
   | 2014/0218595 A1 | 8/2014 | Kanda | |

FOREIGN PATENT DOCUMENTS

| | | | | |
   |---|---|---|---|---|
   | JP | 3-261277 | | 11/1991 | |
   | JP | 04-267210 | * | 9/1992 | ............... G02B 7/28 |
   | JP | 4-267210 | | 9/1992 | |
   | JP | 2012-123324 | * | 6/2012 | ............... G02B 7/28 |

* cited by examiner

FIG. 15

| (2) | (3) | (4) |
|---|---|---|
| (9) | (1) | (5) |
| (8) | (7) | (6) |

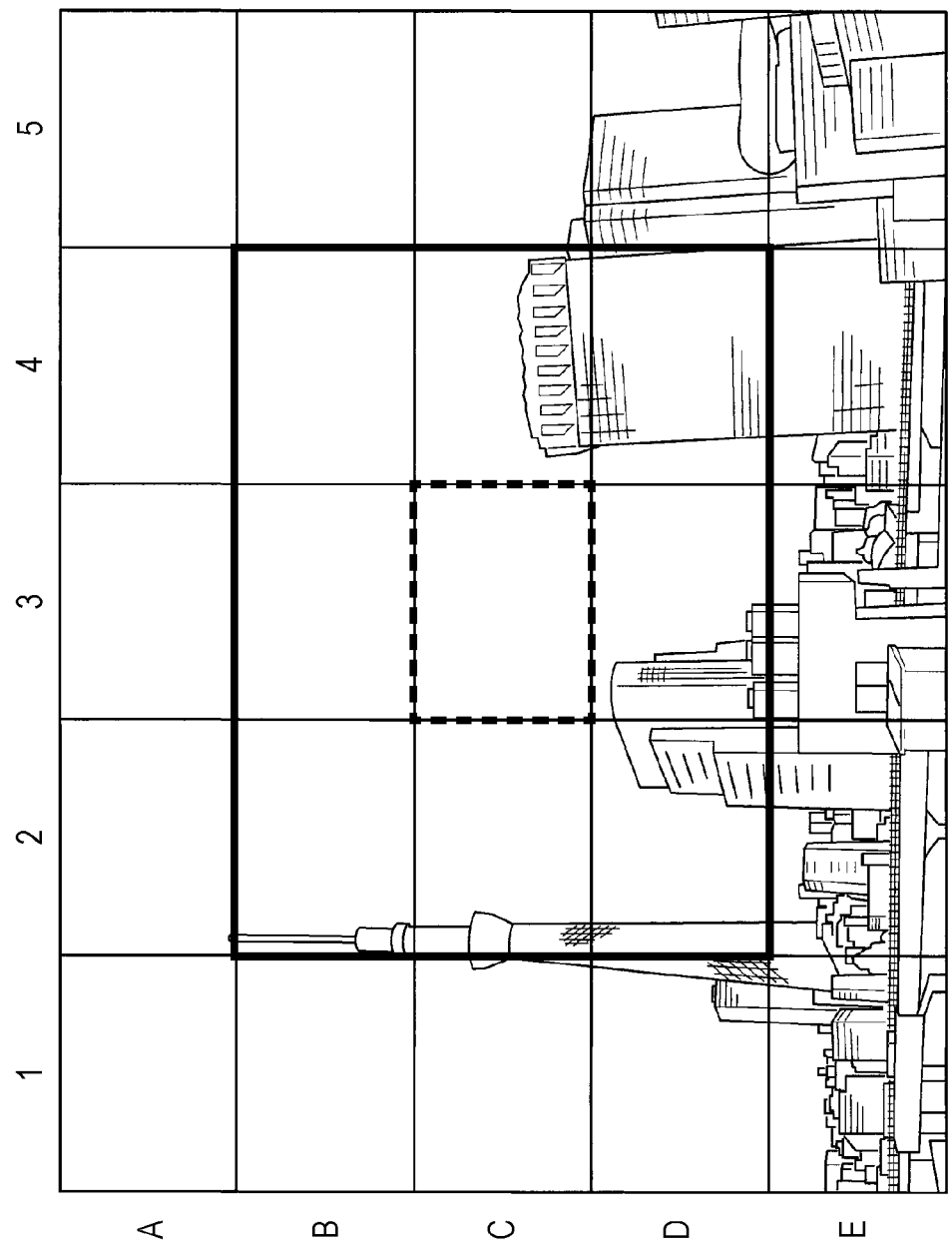

US 9,621,788 B2

FOCUS CONTROL DEVICE, NON-TRANSITORY COMPUTER READABLE RECORDING MEDIUM HAVING THEREIN PROGRAM FOR FOCUS CONTROL, AND METHOD FOR FOCUS CONTROL

CROSS-REFERENCE TO RELATED APPLICATION

This application is based upon and claims the benefit of priority of the prior Japanese Patent Application No. 2014-241124, filed on Nov. 28, 2014, the entire contents of which are incorporated herein by reference.

FIELD

The embodiment discussed herein is related to a focus control device, a non-transitory computer readable recording medium having therein a focus control program, and a method for focus control.

BACKGROUND

There is a technique for performing focus control that repeats a procedure of acquiring image data and computing a contrast value from the acquired image data, while moving the position of a lens, so as to move the lens to a position at which the contrast value peaks. There is another technique for performing focus control that increases the area of an area to be focused on when a peak of the contrast value is not detected in the area to be focused on because high-frequency components are insufficient. There is another technique for performing focus control in which, when a peak of the contrast value is not detected in a first area, a peak of the contrast value is attempted to be detected in a second area with the largest contrast value. There is another technique, in which the position of the main subject being imaged is roughly detected by multipoint distance measurement, and image analysis is performed with respect to the detected position of the main subject, so that the position of the subject being imaged is detected and focus control is performed even when the main subject is present at a position other than the center of a frame.

Examples of the relate-art techniques include Japanese Laid-open Patent Publication No. 3-261277, Japanese Laid-open Patent Publication No. 4-267210, Japanese Laid-open Patent Publication No. 62-182704, and Japanese Laid-open Patent Publication No. 2012-123324.

SUMMARY

According to an aspect of the invention, a focus control device includes: an acquisition unit that acquires image data of a plurality of first frames, each of the plurality of first frames being captured at each of positions of a lens in an optical axis direction, the positions being different each other; and a movement unit that, when a focusing position of the lens is not determined based on contrast evaluation values for an area to be focused on in the plurality of first frames, determines a direction for moving the area to be focused on, based on a magnitude of a contrast evaluation value within the area to be focused on and a position of an area with the contrast evaluation value larger than or equal to a given threshold in each piece of image data of the plurality of first frames or a plurality of second frames newly acquired by the acquisition unit, and moves the area to be focused on in the determined direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a conceptual diagram illustrating an example of division of an area to be focused on according to the embodiment;

FIG. 18 is a conceptual diagram illustrating an example of enlargement of the area to be focused on according to the embodiment.

DESCRIPTION OF EMBODIMENT

With the related-art techniques, when a peak of the contrast value is not detected within the initial area to be focused on, the area of the area to be focused on is increased or the position of the area to be focused on is moved.

However, there is a possibility in the related-art techniques that, when the area of the area to be focused on increases, the load due to a focus control process increases with the enlargement of the area to be processed. In addition, when the position of the area to be focused on is moved, image data outside the current area to be focused on is used for determination of the destination, and thus the area to be processed enlarges, resulting in an increase in the processing load.

It is desired to reduce the load of a focus control process performed when the focusing position of a lens is not determined from contrast evaluation values for an area to be focused on.

Hereinafter, an example of an embodiment of the technique of the present disclosure will be described in detail with reference to the accompanying drawings. It is to be noted that, although the case in which a smart device, as an example of a focus control device according to the technique of the present disclosure, is used will be described by way of example, the technique of the present disclosure is not limited to this. The technique of the present disclosure is applicable to, for example, a compact digital camera with which the user performs an image capture operation while holding the camera by hand, so that an image is acquired, as well as the smart device.

Figure 1:
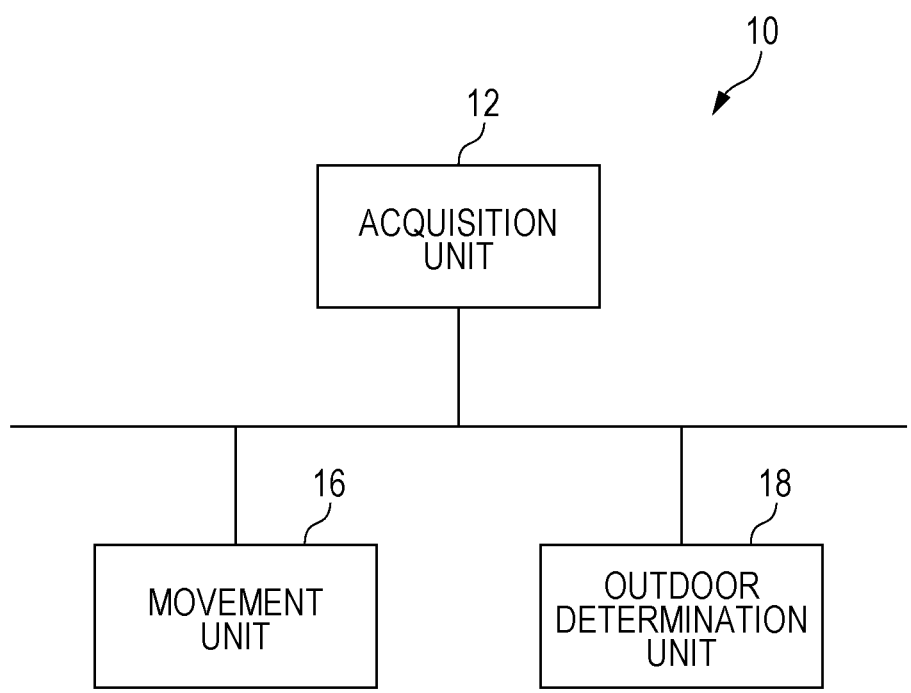
FIG. 1 is a block diagram illustrating an example of principal functions of a smart device according to an embodiment.

A smart device 10 illustrated in FIG. 1, by way of example, includes an acquisition unit 12, a movement unit 16, and an outdoor determination unit 18. The acquisition unit 12, the movement unit 16, and the outdoor determination unit 18 are mutually coupled. The acquisition unit 12 acquires image data of a plurality of first frames differing in the position of a lens in the optical axis direction. When the focusing position of a lens is not determined based on the contrast evaluation values for an area to be focused on in the plurality of first frames, the movement unit 16 determines a direction for moving the area to be focused on and moves the area to be focused on in the determined direction. The direction for moving the area to be focused on is determined based on the magnitude of a contrast evaluation value within the area to be focused on and the position of an area with a contrast evaluation value larger than or equal to a given threshold in each piece of image data of the plurality of first frames. Alternatively, the direction for moving the area to be focused on is determined based on the magnitude of a contrast evaluation value within the area to be focused on and the position of an area with a contrast evaluation value larger than or equal to a given threshold in each piece of image data of a plurality of second frames newly acquired by the acquisition unit 12.

Figure 2:
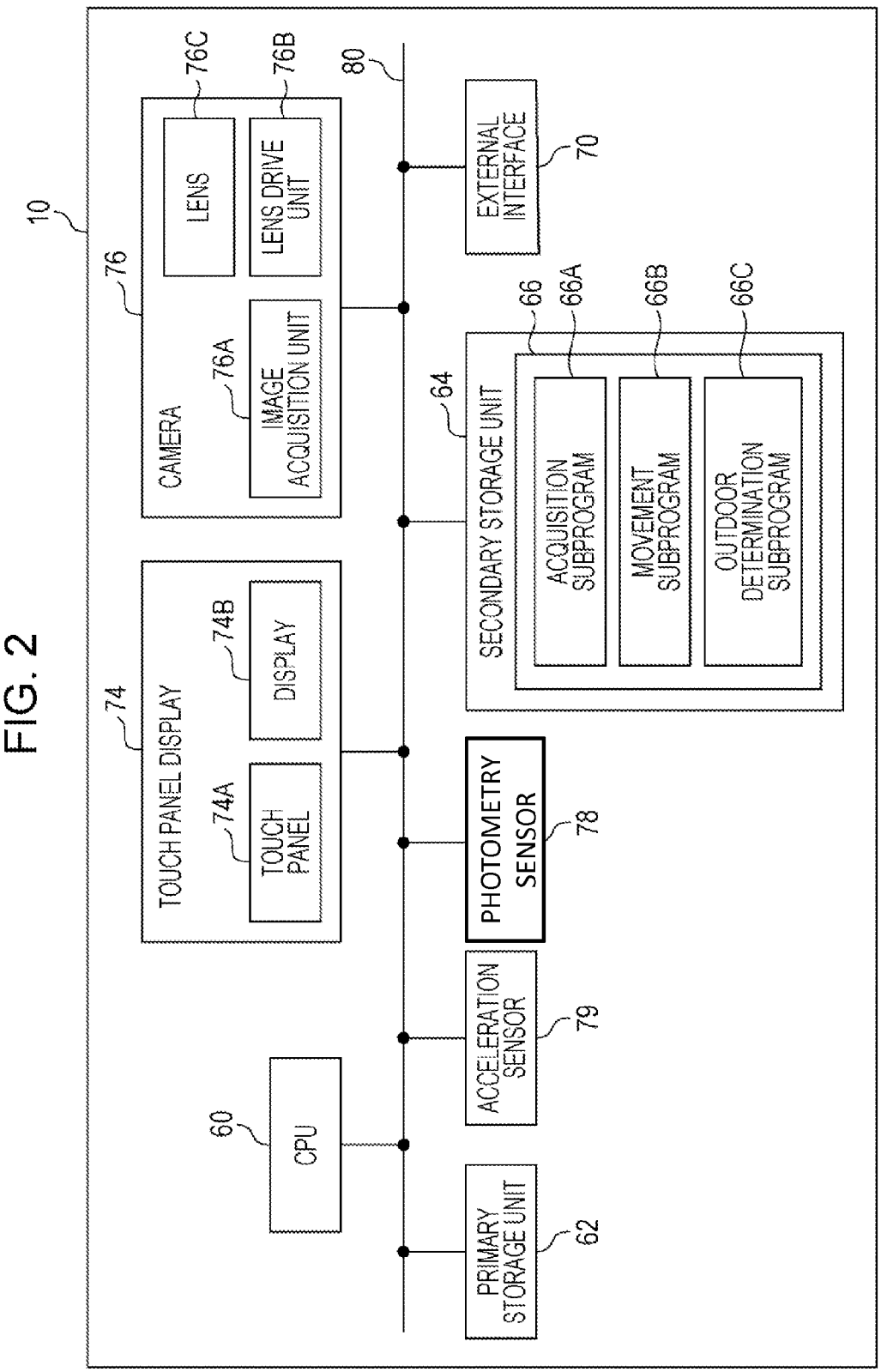
FIG. 2 is a block diagram illustrating an example of a configuration of an electrical system of the smart device according to the embodiment.

The smart device 10 includes, as illustrated in FIG. 2 by way of example, a central processing unit (CPU) 60, a primary storage unit 62, a secondary storage unit 64, an external interface 70, a touch panel display 74, a camera 76, a photometry sensor 78, and an acceleration sensor 79. The touch panel display 74 includes a touch panel 74A and a display 74B. The camera 76 includes an image acquisition unit 76A including an image sensor such as a charge-coupled device (CCD) or a complementary metal oxide semiconductor (CMOS), a lens 76C, and a lens drive unit 76B that moves the lens 76C in the optical axis direction. The CPU 60, the primary storage unit 62, the secondary storage unit 64, the external interface 70, and the touch panel display 74 are mutually coupled via a bus 80.

The touch panel 74A detects a touch operation performed thereon. The display 74B displays an image acquired or the like. The image acquisition unit 76A acquires image data. The lens drive unit 76B includes, for example, a stepping motor or the like and moves the lens 76C in the optical axis direction in a range including a plurality of stages between a macro end and an infinity end. The photometry sensor 78 detects the luminance of a subject being imaged. The acceleration sensor 79 detects a gravitational acceleration direction. The external interface 70 is coupled to an external device and is in charge of transmitting and receiving various kinds of information between the external device and the CPU 60.

The primary storage unit 62 is, for example, a volatile memory such as a random access memory (RAM). The secondary storage unit 64 is, for example, a nonvolatile memory such as a hard disk drive (HDD) or a solid state drive (SSD).

The secondary storage unit 64 stores, by way of example, a focus control program 66 including an acquisition subprogram 66A, a movement subprogram 66B, and an outdoor determination subprogram 66C. The CPU 60 sequentially reads the acquisition subprogram 66A, the movement subprogram 66B, and the outdoor determination subprogram 66C from the secondary storage unit 64 and loads the subprograms into the primary storage unit 62.

The CPU 60 operates as the acquisition unit 12 illustrated in FIG. 1 by executing the acquisition subprogram 66A. The CPU 60 operates as the moving unit 16 illustrated in FIG. 1 by executing the movement subprogram 66B. The CPU 60 operates as the outdoor determination unit 18 illustrated in FIG. 1 by executing the outdoor determination subprogram 66C. Note that the focus control program 66 is an example of the focus control program according to the technique of the present disclosure.

Figure 3:
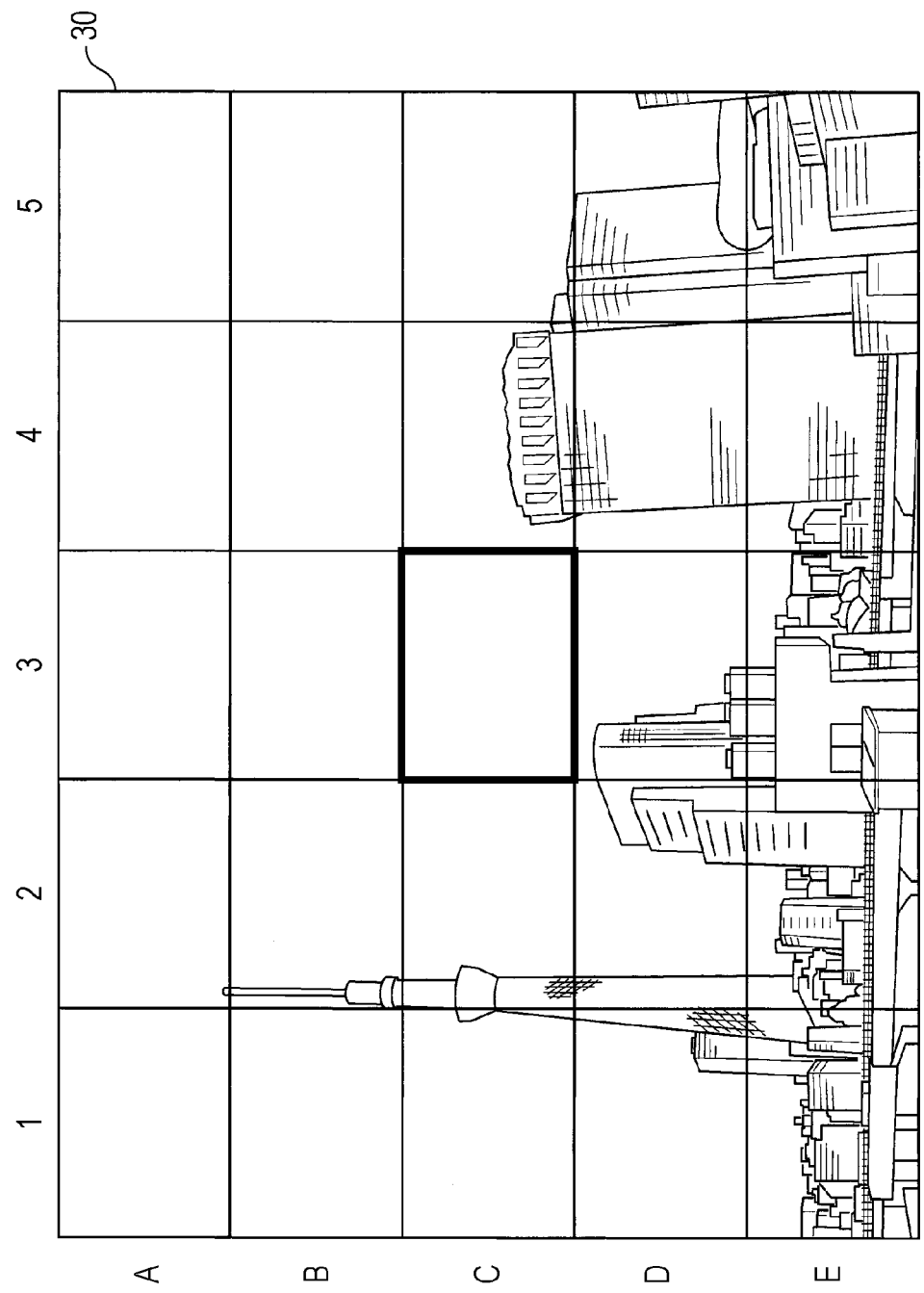
FIG. 3 is a conceptual diagram depicting an example of an image acquisition area and an area to be focused on according to the embodiment.

FIG. 3 depicts an example of an image acquisition area 30 according to the present embodiment. The image acquisition area 30 is the area of a frame captured by an image sensor. The image acquisition area 30 is divided into a grid pattern in which a plurality of areas are provided in each of the vertical direction and the horizontal direction. Here, the example in which the image acquisition area 30 is divided horizontally into five columns, 1 to 5, and vertically into five rows, A to E, is presented. That is, the image acquisition area 30 is divided into 5×5 areas, that is, c25 areas. For example, a central area surrounded by a bold line is a C-th row and third column area, which is referred to as an area C3 hereinafter. In this embodiment, the area C3 is an area to be focused on in the initial setting. The area to be focused on is a partial area of an image acquisition area and is an area used for focusing.

Next, a focus control process performed by the smart device 10 when the CPU 60 executes the focus control program 66, as operations of the present embodiment, will be described with reference to FIG. 4.

The focus control process is started, for example, by the user tapping a capture start button or the like, which is not illustrated in the drawings, displayed on the touch panel display 74 of the smart device 10.

Figure 4:
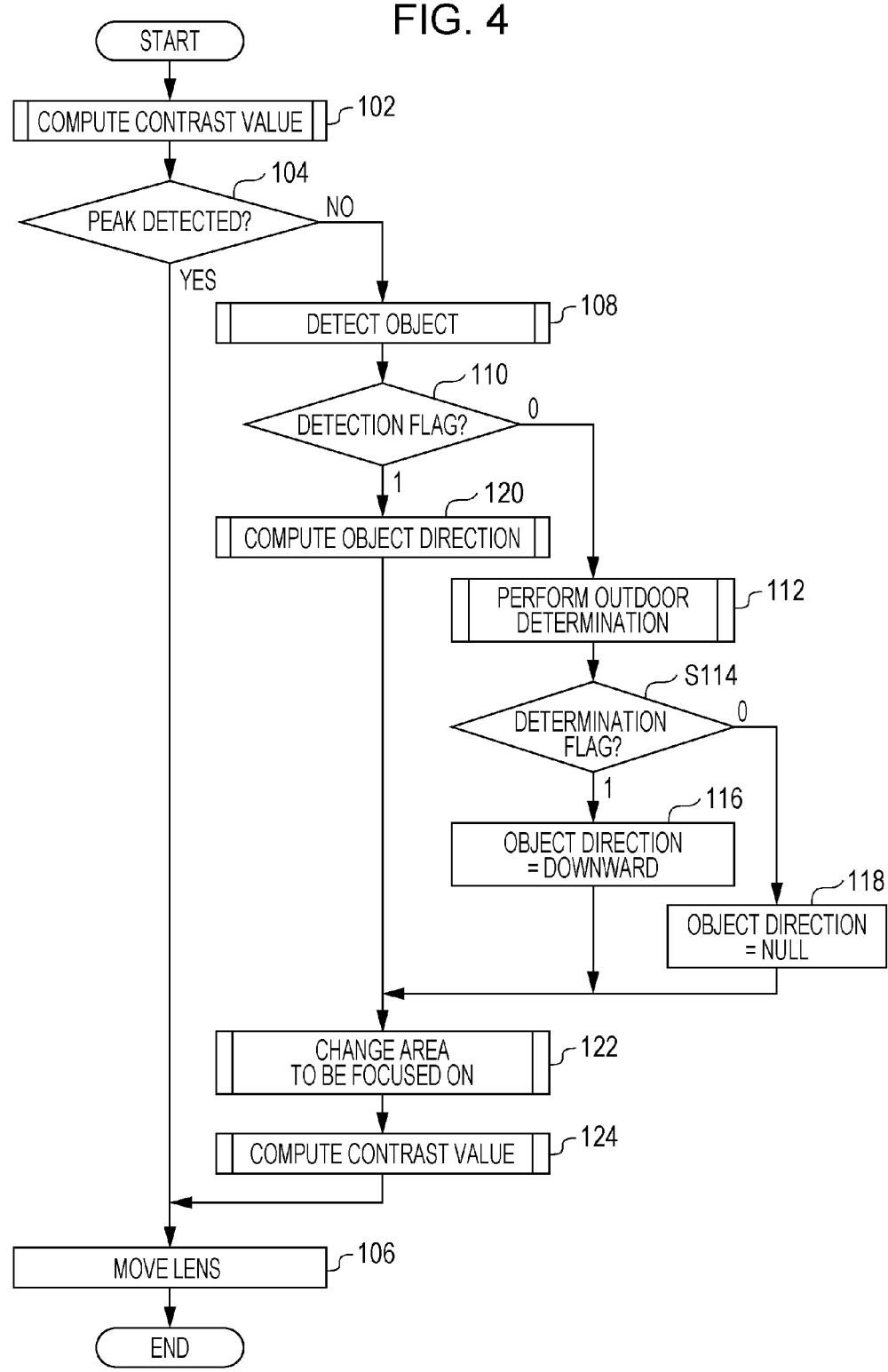
FIG. 4 is a flowchart illustrating an example of a focus control process according to the embodiment.
Figure 5:
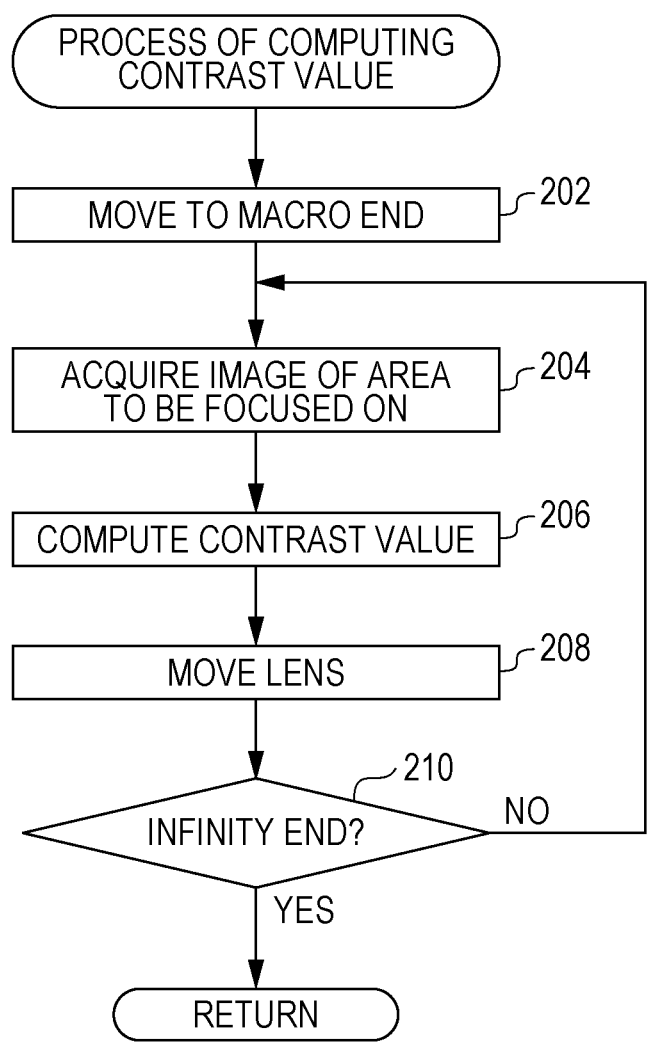
FIG. 5 is a flowchart illustrating an example of a process of computing a contrast value according to the embodiment.

In step 102 in FIG. 4, the CPU 60 starts a process of computing a contrast value (hereinafter referred to as a contrast value computing process), the details of which are illustrated in FIG. 5. In step 202 in FIG. 5, the CPU 60 moves the lens 76C to the macro end by using the lens drive unit 76B. In step 204, the CPU 60 acquires image data of the area to be focused on C3 by using the image acquisition unit 76A. Note that image data acquired here is an example of image data of a plurality of first frames. Image data corresponding to one frame including the area to be focused on C3 may be acquired.

In step 206, the CPU 60 computes the contrast value of image data acquired in step 204. The contrast value is computed, for example, by formula (1) in which a ratio of the difference between a maximum luminance value and a minimum luminance value to the sum of the maximum luminance value and the minimum luminance value is expressed. In formula (1), Lmax is the maximum luminance value and Lmin is the minimum luminance value. A luminance value L is computed by formula (2), where R is the red component of a pixel value, G is the green component of the pixel value, and B is the blue component of the pixel value.

$$\text{Contrast value} = (L\max - L\min)/(L\max + L\min) \quad (1)$$

$$\text{Luminance value } L = 0.299R + 0.587G + 0.114B \quad (2)$$

Note that the contrast evaluation value in the technique of the present disclosure is not limited to the contrast value mentioned above. For example, the contrast evaluation value may be another evaluation value in correlation with the contrast value, in particular, the sharpness or the like.

In step 208, the CPU 60 moves the lens 76C by an amount corresponding to a given number of stages from the macro end toward the infinity end by using the lens drive unit 76B. In step 210, the CPU 60 determines whether or not the lens 76C has been moved by an amount corresponding to the number of stages from the macro end to the infinity end. When the determination is negative, the CPU 60 returns to step 204 and repeats processing from step 204 to step 210 until the lens 76C reaches the infinity end. In step 208, the number of states by which the lens 76C is moved is set so that, for example, image data of 15 frames is able to be acquired until the lens 76C reaches the infinity end. As a result of the above, the lens 76C is moved by a given number of stages from the macro end to the infinity end, and the contrast value is computed each time the lens 76C is moved.

In step 210, when the CPU 60 determines that the lens 76C has been moved to the infinity end, the CPU 60 completes the contrast value computing process and proceeds to step 104 in FIG. 4.

In step 104 in FIG. 4, from the contrast value of image data of the area to be focused on that is computed in step 206 in FIG. 5, a peak of the contrast value obtained as the lens position moves is detected by using a hill-climbing method. When a peak is detected in step 104, then, in step 106, the lens 76C is driven by using the lens drive unit 76B so as to be moved to a position at which the peak has been detected. Thus, the focus control process ends.

Figure 7A:
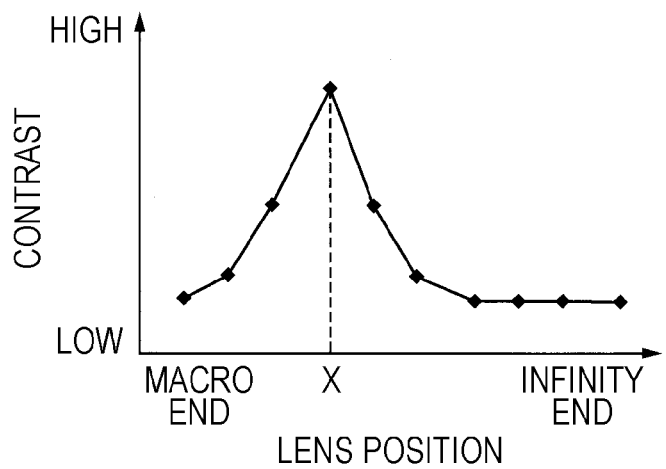
FIG. 7A is a graph depicting an example of contrast values according to the embodiment.
Figure 7B:
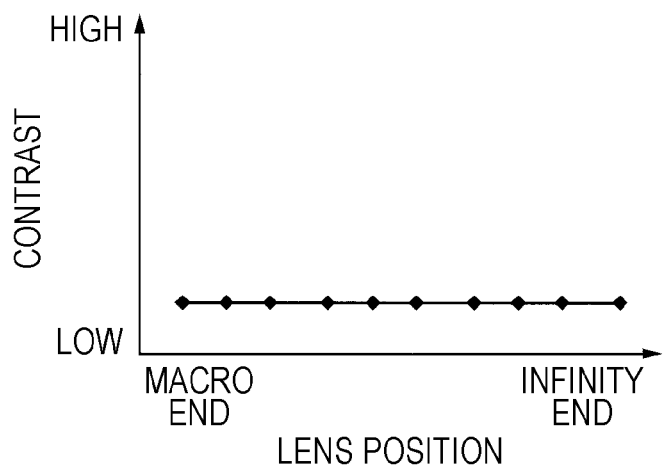
FIG. 7B is a graph depicting an example of contrast values according to the embodiment.
Figure 7C:
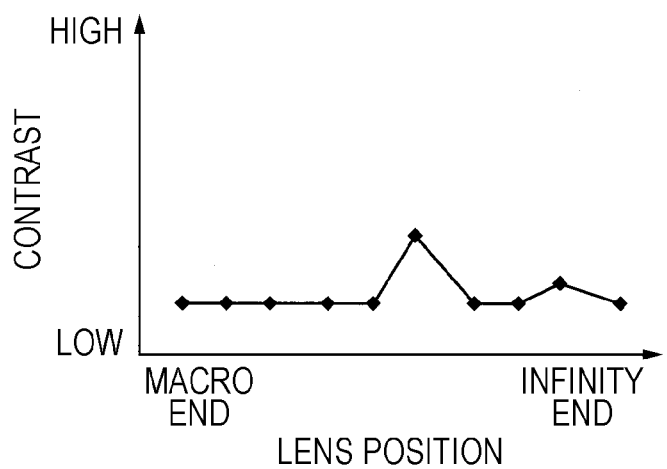
FIG. 7C is a graph depicting an example of contrast values according to the embodiment.

FIG. 7A to FIG. 7C illustrate graphs in which the vertical axis represents the contrast and the horizontal axis represents the lens position. As illustrated in FIG. 7A, when a peak of the contrast is present at a lens position X, the CPU 60 moves the lens 76C to the lens position X by using the lens drive unit 76B and then completes the focus control process.

Figure 6:
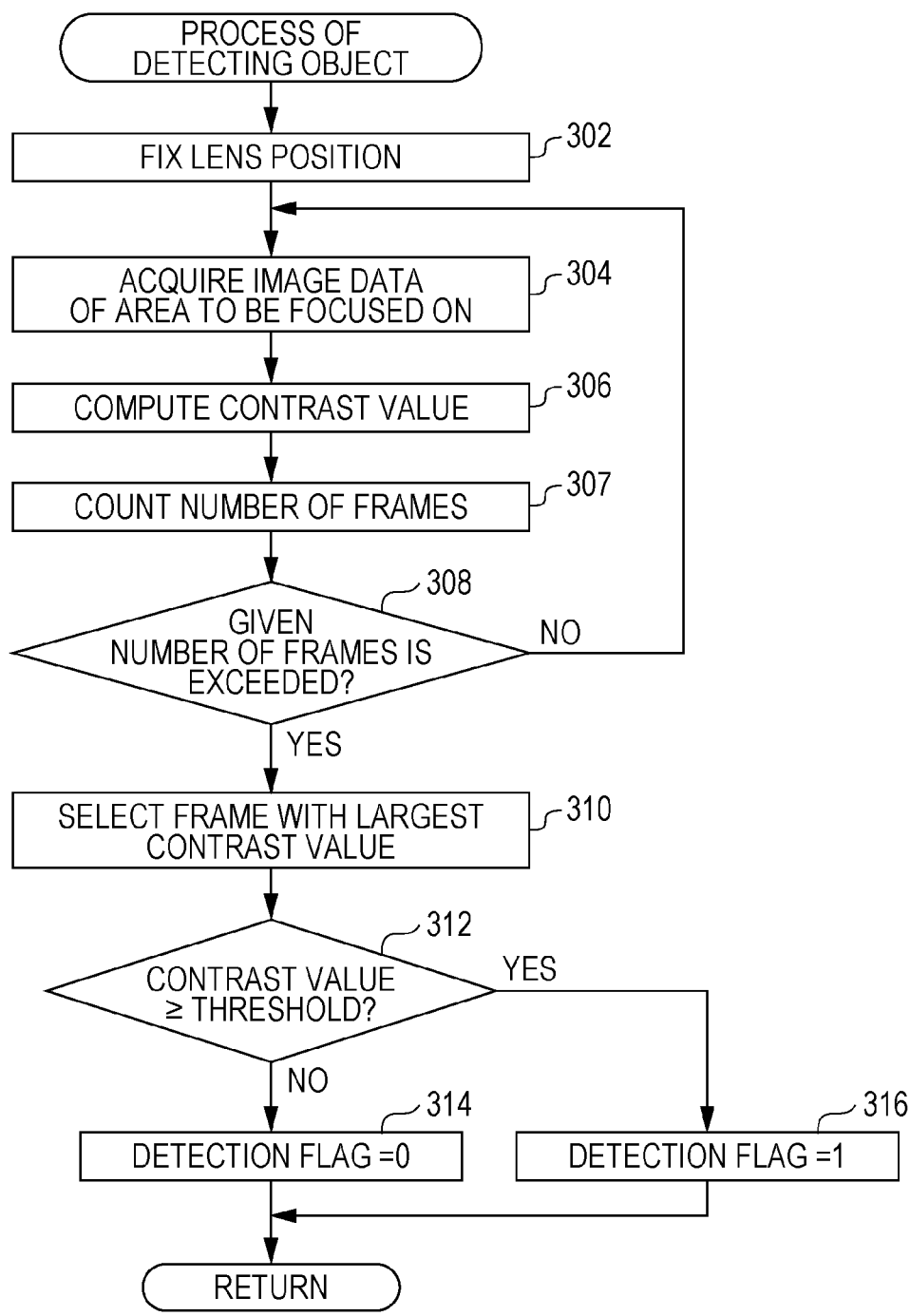
FIG. 6 is a flowchart illustrating an example of a process of detecting an object according to the embodiment.

On the other hand, when a peak is not detected in step 104, the CPU 60 proceeds to step 108, where a process of detecting an object (hereinafter referred to as an object detection process), the details of which are illustrated in FIG. 6, is performed. For example, when a peak of the contrast value is not present as depicted in FIG. 7B, and when a plurality of peaks of contrast values are present as depicted in FIG. 7C and it is not possible to determine what peak is an appropriate peak, the CPU 60 executes the object detection process. Details of the object detection process are illustrated in FIG. 6.

In step 302 of FIG. 6, the CPU 60 moves the lens 76C to a predetermined position by using the lens drive unit 76B and then stops the lens 76C at the predetermined position. The predetermined position is, for example, a lens position at which an object present at a position apart therefrom by 1 meter is focused on. The predetermined position is computed in advance by a lens image formation formula. In step 304, the CPU 60 acquires image data of the area to be focused on C3, which is an initial area to be focused on, by using the image acquisition unit 76A. In step 306, the CPU 60 computes the contrast value of the area to be focused on C3. In step 307, the CPU 60 counts the number of frames of the acquired image data, and, in step 308, the CPU 60 determines based on the count obtained in step 307 whether or not image data of the area to be focused on C3 the amount of which exceeds a predetermined number of frames has been acquired in step 304. When it is determined, in step 308, that image data of the area to be focused on C3 the amount of which exceeds the predetermined number has not been acquired, the CPU 60 returns to step 304 and repeats processing of step 304 to step 308. The predetermined number of frames may be, for example, 15. Note that image data acquired here is an example of image data of a plurality of second frames.

When it is determined, in step 308, that image data the amount of which exceeds the predetermined number of frames has been acquired, the CPU 60 proceeds to step 310, where the CPU 60 selects a frame with the largest contrast value among image data acquired in step 304. In step 312, the CPU 60 determines whether or not the contrast value in the frame selected in step 310 is larger than or equal to a given threshold. When, in step 312, it is determined that the contrast value is larger than or equal to the given threshold, an object available for focusing is present. Thus, in step 316, the CPU 60 sets a detection flag to one and completes the object detection process and then proceeds to step 110 illustrated in FIG. 4.

When, in step 312, it is determined that the contrast value is less than a given threshold, an object available for focusing is not present. Thus, in step 314, the CPU 60 sets the detection flag to zero and completes the object detection process and then proceeds to step 110 in FIG. 4. The threshold may be, for example, 0.4; however, the technique of the present disclosure is not limited to this.

Figure 8:
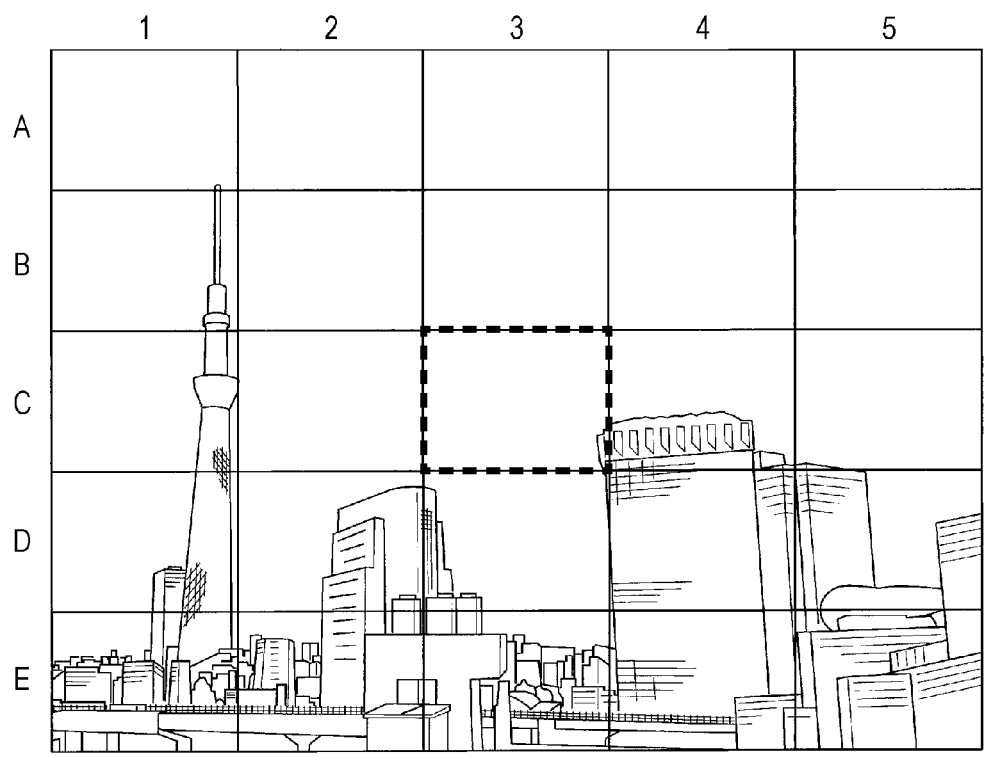
FIG. 8 is a conceptual diagram depicting an example of an image acquisition area according to the embodiment.
Figure 9:
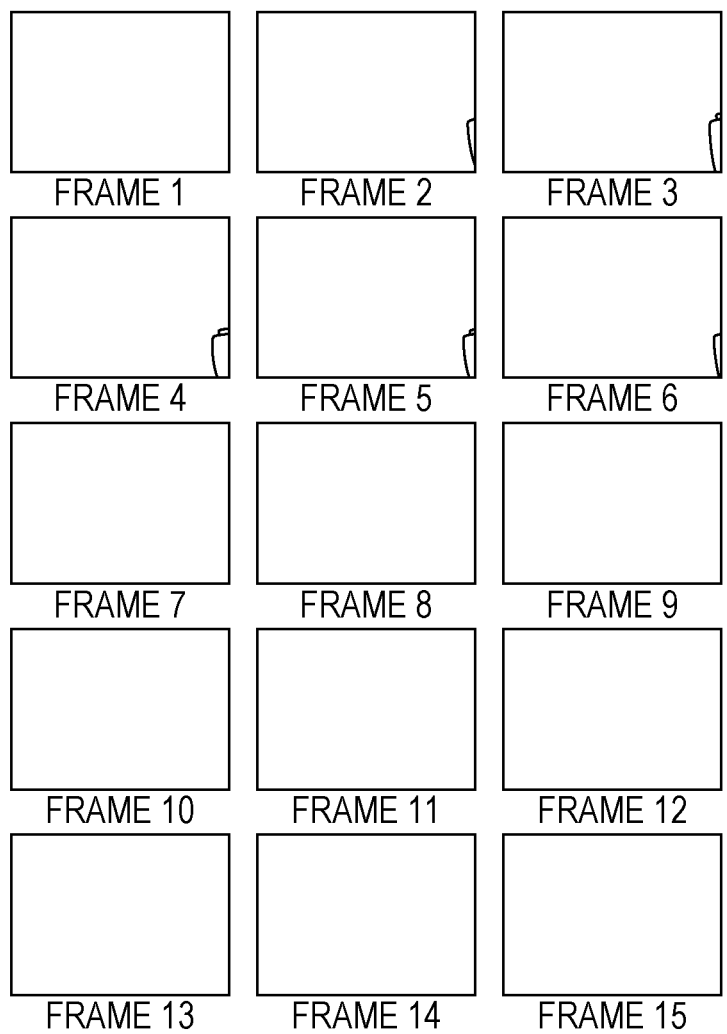
FIG. 9 is a conceptual diagram depicting an example of an area to be focused on according to the embodiment.

The present embodiment is applied to the case where the user holds the smart device 10 by hand while image data of the initial area to be focused on is acquired in step 204 of the contrast value computing process and in step 304 of the object detection process. When the user attempts to acquire image data of a landscape depicted in FIG. 8, image data of the area to be focused on C3 varies because of hand-held camera shake as depicted in frame 1 to frame 15 in FIG. 9 even when the user does not consciously move his hand. For example, in frame 2 to frame 6 depicted in FIG. 9, image data of an object (an upper end corner portion of a multi-storied building) enters the area to be focused on C3 at the bottom right corner thereof. Here, the contrast value of image data of frame 4 depicted in FIG. 9 is largest, and frame 4 depicted in FIG. 9 is selected in step 310. When the contrast value is larger than or equal to the given threshold, the detection flag is set to one in step 316. When the contrast value is less than the given threshold, the detection flag is set to zero in step 314.

Figure 10:
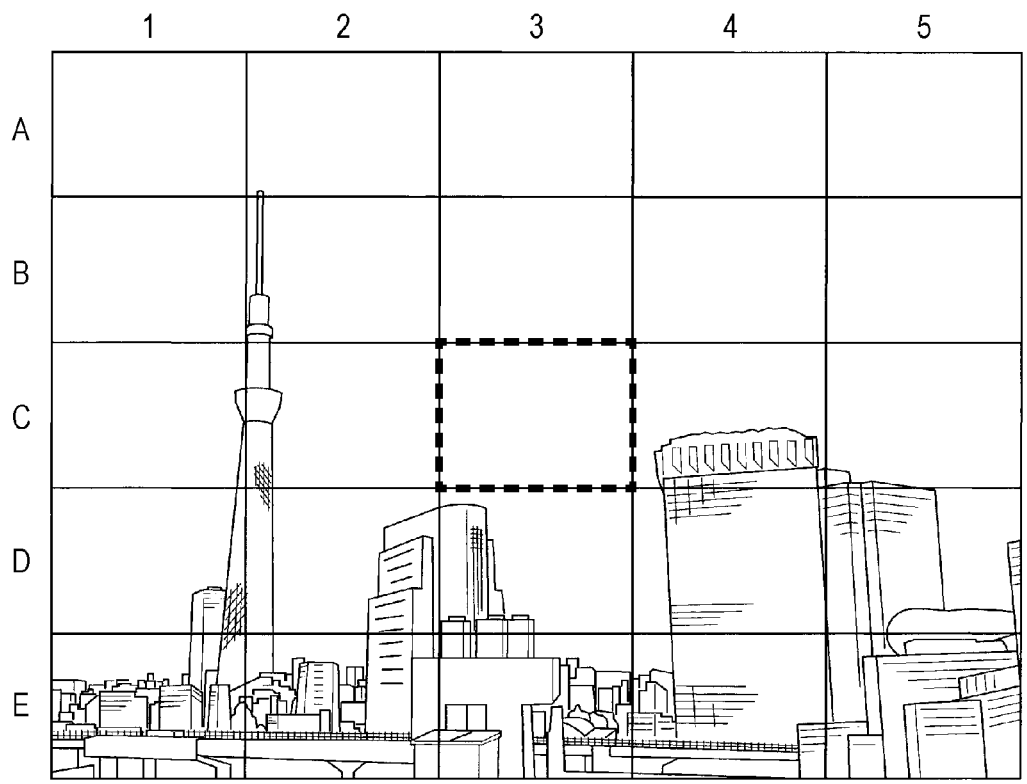
FIG. 10 is a conceptual diagram depicting an example of the image acquisition area according to the embodiment.
Figure 11:
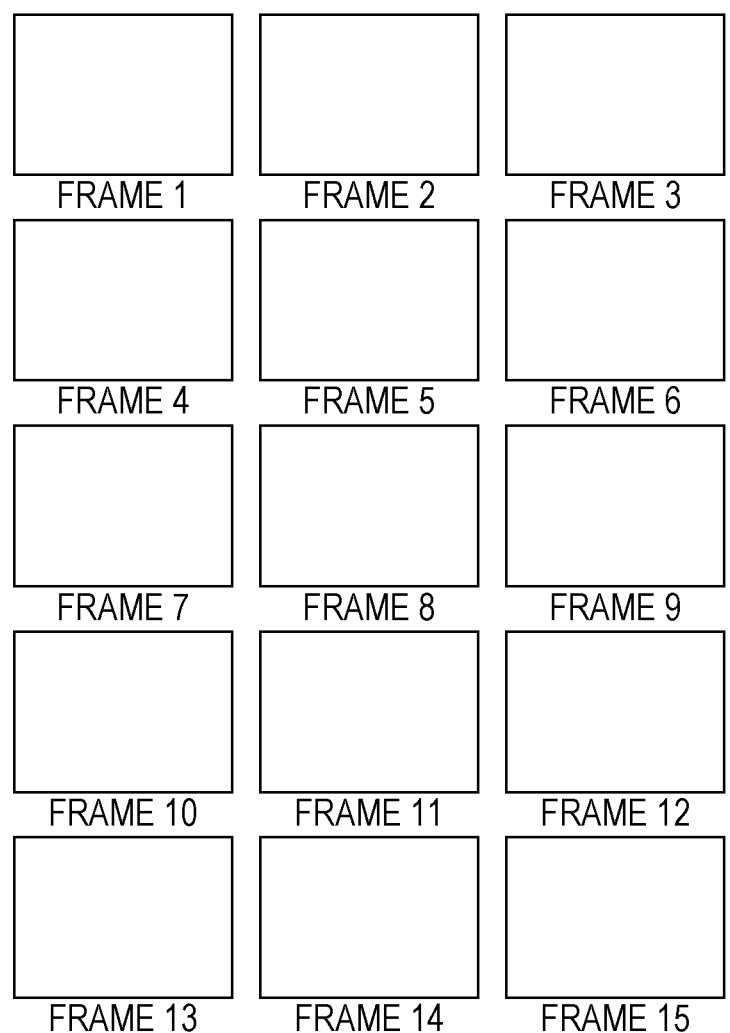
FIG. 11 is a conceptual diagram depicting an example of the area to be focused on according to the embodiment.

When the user attempts to acquire image data of a landscape exemplified in FIG. 10, image data of the area to be focused on C3 does not vary when a hand-held camera shakes, as exemplified in frame 1 to frame 15 in FIG. 11. That is, in frame 1 to frame 15 in FIG. 11, image data of an object does not enter the area to be focused on C3. This is because there is no object near a portion of the landscape corresponding to the area to be focused on C3. Here, the contrast value of image data in any frame is less than the given threshold, and the detection flag is set to zero in step 314.

Figure 12:
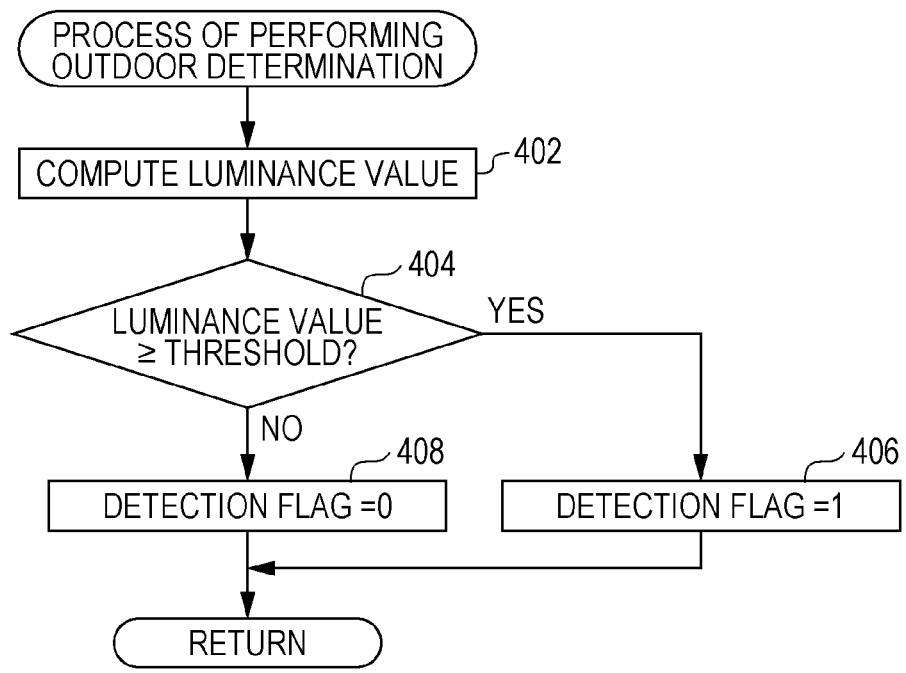
FIG. 12 is a flowchart illustrating an example of a process of performing outdoor determination according to the embodiment.

In step 110 in FIG. 4, the CPU 60 determines whether the detection flag is zero or one. It is determined that the detection flag is zero, the CPU 60 proceeds to steps 112, where the CPU 60 executes a process of performing outdoor determination (hereinafter referred to as an outdoor determination process), the details of which are illustrated in FIG. 12. In step 402 in FIG. 12, the CPU 60 computes a subject luminance value BV based on the luminance of a subject being imaged, the luminance of the subject being detected by the photometry sensor 78.

In step 404, the CPU 60 determines whether or not the subject luminance value BV is larger than or equal to a given threshold. When, in step 404, it is determined that the subject luminance value BV is larger than or equal to the given threshold, then the CPU 60 determines, in step 406, that image data of the area to be focused on C3 is outdoor image data, sets the determination flag to one and completes the outdoor determination process. Then, the CPU 60 proceeds to step 114 in FIG. 4. When, in step 404, it is determined that the subject luminance value BV is less than the given threshold, then, the CPU 60 determines, in step 408, that image data of the area to be focused on C3 is indoor image data, sets the determination flag to zero and completes the outdoor determination process and then proceeds to step 114 in FIG. 4. The given threshold may be, for example, five.

Figure 13:
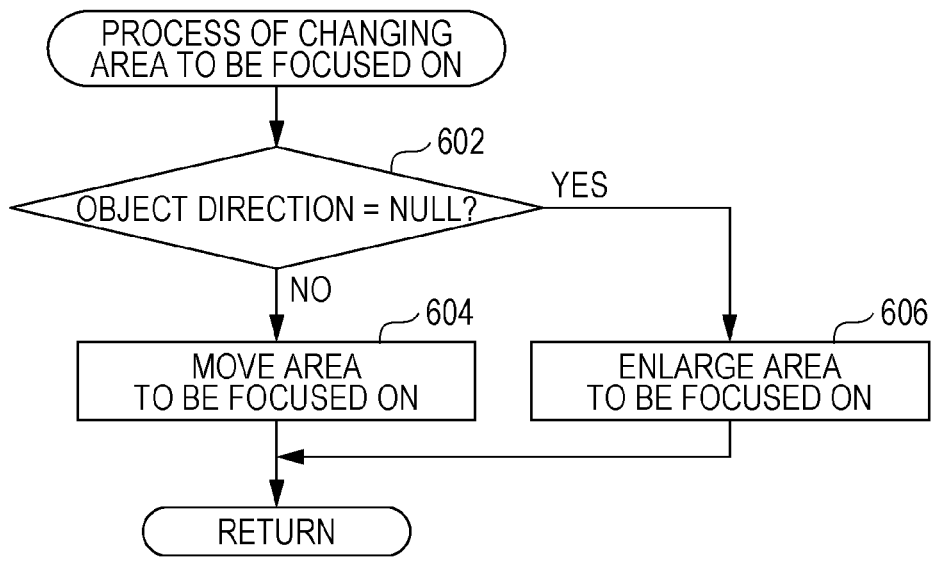
FIG. 13 is a flowchart illustrating an example of a process of changing an area to be focused on according to the embodiment.

In step 114 in FIG. 4, the CPU 60 determines whether the determination flag is zero or one. When, in step 114, it is determined that the determination flag is one, then, in step 116, the CPU 60 sets the direction of an object (hereinafter referred to as an object direction) to a gravitational acceleration direction detected by the acceleration sensor 79 (hereinafter, the gravitational acceleration direction is referred to as a downward direction for the sake of convenience, and other directions are described with respect to the downward direction) and proceeds to step 122, where the CPU 60 executes a process of changing an area to be focused on, the details of which are illustrated in FIG. 13. When an object is not detected in an area to be focused on out of doors, the image data in question is highly likely to correspond to the sky. In that case, an object available for focusing is highly likely to be present in an area positioned below the area to be focused on, that is, an area present in the gravitational acceleration direction of the subject. Thus, as described below, the area to be focused on is moved in the downward direction within the image acquisition area 30.

When, in step 114, it is determined that the determination flag is zero, then, in step 118, the CPU 60 sets the object direction to null, proceeds to step 122, and executes the process of changing an area to be focused on, the details of which are illustrated in FIG. 13. When an object is not detected in an area to be focused on in the doors, it is unclear where an object available for focusing is highly likely to be present. Thus, as described below, the area to be focused on is not moved and the area of the area to be focused on is increased. This is because increasing the area of the area to be focused on increases the likelihood that image data corresponding to an object available for focusing is included in the image data of the area to be focused on.

The processing in step 110 illustrated in FIG. 4 will be described again. When, when the CPU 60 determines whether the detection flag is zero or one, it is determined that the detection flag is one, the CPU 60 proceeds to step 120, where the CPU 60 executes a process of computing an object direction, the details of which are illustrated in FIG. 14.

Figure 14:
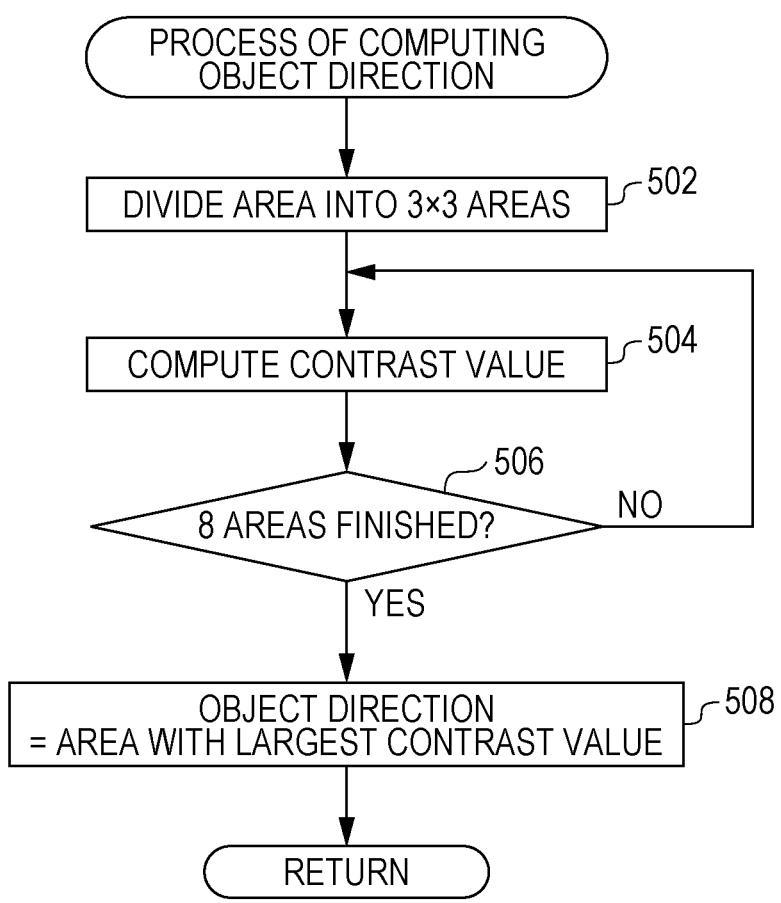
FIG. 14 is a flowchart illustrating an example of a process of computing an object direction according to the embodiment.

In step 502 in FIG. 14, the CPU 60 divides the area to be focused on C3 into a plurality of areas of 3×3 as illustrated in FIG. 15. In step 504, the CPU 60 computes the contrast value of image data corresponding to an area denoted by (2) in FIG. 15. In step 506, the CPU 60 determines whether or not all the contrast values of 8 areas (2) to (9) other than the center area denoted by (1) have been computed. When, in step 506, it is determined that all the contrast values of eight areas other than the center area (1) have not been computed, the CPU 60 returns to step 504 and repeats the processing of step 504 and step 506 until all the contrast values of areas (2) to (9) have been computed.

When, in step 506, it is determined that all the contrast values of areas (2) to (9) have been computed, then, in step 508, the CPU 60 sets a direction from the center of the area to be focused on C3 toward an area with the largest contrast value as the object direction and proceeds to step 122 in FIG. 4, where the CPU 60 executes the process of changing an area to be focused on, the details of which are illustrated in FIG. 13.

In image data exemplified in frame 4 in FIG. 9 selected in step 310, area (6) has the largest contrast value, and thus a direction to area (6) is set as the object direction. When area (6) at the bottom right corner of the area to be focused on C3 has the largest contrast value, an object available for focusing is highly likely to be present in an area D4 that is present diagonally right downward of the area to be focused on C3. Thus, as described below, the area to be focused on is moved in a diagonally right downward direction.

In step 602 in FIG. 13, the CPU 60 determines whether or not the object direction is null. When, in step 602, it is determined that the object direction is not null, then, in step 604, the CPU 60 moves the area to be focused on in a direction set as the object direction, and then, in step 124 in FIG. 4, executes the contrast value computing process, the details of which are illustrated in FIG. 5.

Figure 16:
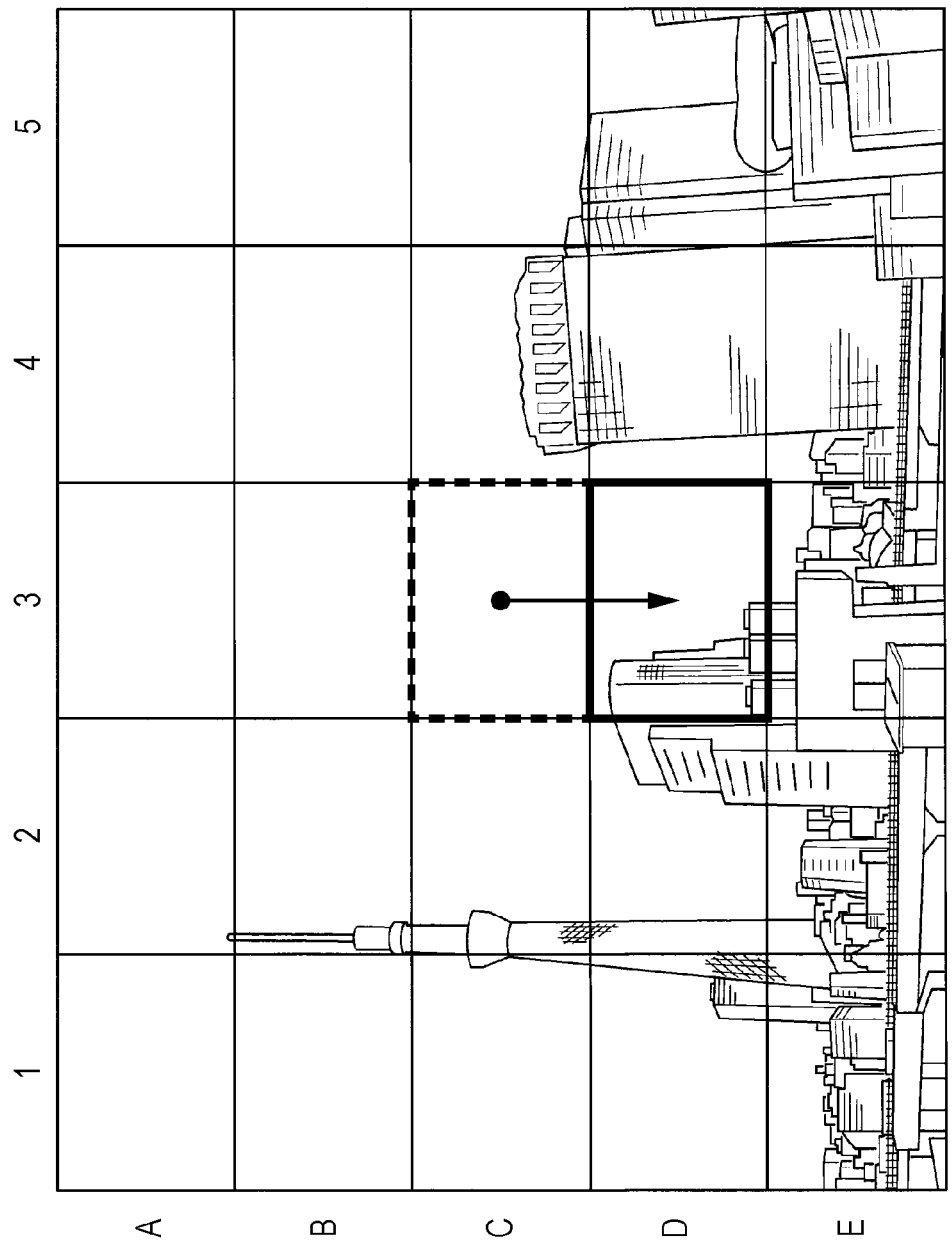
FIG. 16 is a conceptual diagram illustrating an example of movement of an area to be focused on according to the embodiment.

For example, when, in step 116, the downward direction is set as the object direction, the area to be focused on moves from the area C3 to an area D3 as depicted in FIG. 16.

Figure 17:
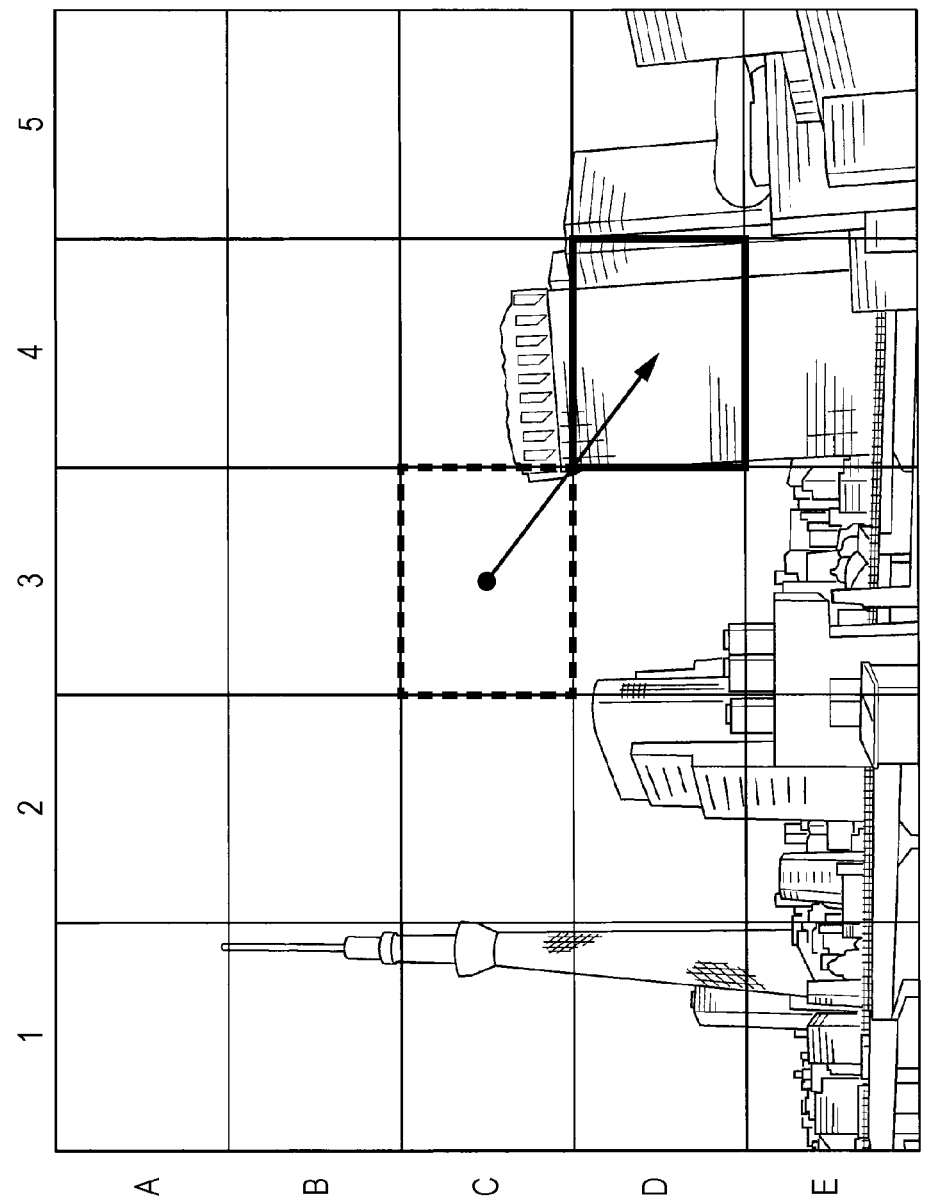
FIG. 17 is a conceptual diagram illustrating an example of movement of the area to be focused on according to the embodiment.

For example, when, in step 508, the diagonally right downward direction is set as the object direction, the area to be focused on moves from the area C3 to an area D4 as depicted in FIG. 17.

When, in step 602, it is determined that the object direction is null, then, in step 606, as depicted in FIG. 18, the CPU 60 enlarges the area to be focused on from the area C3 to a rectangular area including areas B2, B3, B4, C2, C3, C4, D2, D3, and D4. Next, in step 124 in FIG. 4, the CPU 60 executes the contrast value computing process, the details of which are illustrated in FIG. 5.

The contrast value computing process in step 124 has been described above, and thus details thereof will be omitted. Upon completion of the contrast value computing process, the CPU 60, in step 106, drives the lens 76C by using the lens drive unit 76B, so that the lens 76C moves to a position at which the contrast value peaks, and completes the focus control process.

In the technique of the present disclosure, image data of a plurality of first frames including frames in accordance with positions of a lens moving in the optical axis direction is acquired. Additionally, in the technique of the present disclosure, when the focusing position of a lens is not determined based on the contrast values for an area to be focused on in the plurality of first frames, image data of a plurality of second frames is acquired. Additionally, in the technique of the present disclosure, the direction in which the area to be focused on is moved is determined based on the magnitude of the contrast value for the area to be focused on and the contrast position of the area to be focused on in each of the plurality of second frames, and the area to be focused on is moved in the determined direction. Thus, in the technique of the present disclosure, even when the focusing position of a lens is not determined based on the contrast values for the area to be focused on in the plurality of first frames, the area to be focused on may be moved to an area where image data corresponding to an object available for focusing is highly likely to be present. Here, image data outside the area to be focused on is not used. Accordingly, the load caused by the focus control process may be reduced.

In the technique of the present disclosure, when an area with a contrast value exceeding a threshold is not detected from areas (2) to (9) within the area to be focused on, the position of the area to be focused on is moved in the downward direction of the area to be focused on when image data of the area to be focused on is outdoor image data. Thus, in the technique of the present disclosure, when it is unclear which of areas (2) to (9) within the area to be focused on is an area where image data corresponding to an object available for focusing is present, the area to be focused on may be moved in a direction in which image data corresponding to an object available for focusing is highly likely to be present. Accordingly, the load caused by the focus control process may be reduced.

In the technique of the present disclosure, when the image data of the area to be focused on described above is not outdoor image data, the area of the area to be focused on is increased. Thus, in the technique of the present disclosure, when the position of an area where image data corresponding to an object available for focusing for the existing area to be focused on is present is unclear, the image data corresponding to an object available for focusing may be included in an enlarged area to be focused on. Accordingly, the load caused by the focus control process may be reduced.

Note that, in the above, the manner in which the focus control program 66 is stored (installed) in advance in the secondary storage unit 64 has been described. However, the focus control program 66 may be provided in a manner in which it is recorded on a non-transitory recording medium such as a compact disc read-only memory (CD-ROM) or a digital video disc-ROM (DVD-ROM). In addition, the focus control program 66 may be stored in a remote server. For example, a smart device may receive a result of execution of the focus control program 66 stored in a remote server via a communication line such as the Internet.

Note that, in the above embodiment, the image acquisition area 30 is divided into areas in a grid pattern of 5×5 as depicted in FIG. 3; however, the technique of the present disclosure is not limited to this. For example, the image acquisition area 30 may be divided into areas in a grid pattern of 6×6, or may be divided into areas in a grid pattern of 16×16.

Note that, in the above embodiment, the initial area to be focused on is set to the area C3 depicted in FIG. 3; however, the technique of the present disclosure is not limited to this. For example, a rectangular area including areas B2, B3, B4, C2, C3, C4, D2, D3, and D4 may be used as the area to be focused on.

Note that, in the above embodiment, the case where the lens 76C is moved from the macro end to the infinity end in the contrast value computing process illustrated in FIG. 5 has been described; however, the technique of the present disclosure is not limited to this. For example, when the current position of the lens 76C is close to the infinity end, the lens 76C may be moved from the infinity end to the macro end. Additionally, the lens 76C starts moving from one end position toward the other end position, and, when a peak of the contrast value that may be determined as the focusing position is detected, the movement of the lens 76C toward the other end position may be stopped and the lens 76C is moved toward the focusing position.

Note that, in the above embodiment, in the contrast value computing process illustrated in FIG. 5, image data of an area to be focused on is acquired and then the lens 76C is moved; however, the technique of the present disclosure is not limited to this. After the lens 76C is moved, image data of an area to be focused on may be acquired.

Note that image data for the area to be focused on in frame 1 to frame 15 depicted in FIG. 9 may be captured so that an object enters the area to be focused on when a camera held by a hand of the user shakes. However, the technique of the present disclosure is not limited to this. For example, image data may be captured so that an object enters the area to be focused on, for example, in a way that, for the purpose of moving the area to be focused on, the user moves his hand finely while intentionally holding a smart device so that an object enters the area to be focused on.

Note that, in the above embodiment, the outdoor determination process exemplified in FIG. 12 is executed using the subject luminance value BV; however, the technique of the present disclosure is not limited to this. For example, using a typical sky detection algorithm or a blue-sky detection algorithm, it may be determined that image data of an area to be focused on is image data corresponding to the sky or blue sky.

Note that, in the above embodiment, in step 604 in FIG. 13, the example where the area to be focused on is moved by an amount corresponding to the height of the row or the width of the column used for dividing the area to be focused on has been described as exemplified in FIG. 16 and FIG. 17; however, the technique of the present disclosure is not limited to this. For example, the area to be focused on may be moved by an amount corresponding to half the height of the row and half the width of the column.

Note that, in the above embodiment, in step 606, as exemplified in FIG. 18, the example where the area to be focused on is enlarged by an amount corresponding to the height of the row and the width of the column has been described; however, the technique of the present disclosure is not limited to this. For example, the height and the width by which the area to be focused on is enlarged may be half the height of the row and half the width of the column.

Note that, for example, the image acquisition area 30 depicted in FIG. 3 may be displayed on the touch panel display 74 during the focus control process. The lines indicating boundaries between rows and between columns and lines indicating the area to be focused on may also be displayed on the touch panel display 74.

In addition, in the above, the manner in which, when, after acquisition of the image data of a plurality of first frames, the focusing position of a lens is not determined from contrast evaluation values, the image data of a plurality of second frames is acquired under the condition where the lens 76C is positioned at a given location has been described. However, the technique of the present disclosure is not limited to this. Acquisition of the image data of the plurality of second frames may be omitted, and, using the image data of a plurality of first frames, the processing of the object detection process in step 108 in FIG. 4 and thereafter may be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A focus control device comprising:
   an acquisition unit that acquires image data of a plurality of first frames, each of the plurality of first frames having an image acquisition area captured by an image sensor, each of the plurality of first frames being captured at each of one of a plurality of positions of a lens in an optical axis direction, each of the plurality of positions being different each other, and each image acquisition area being divided into a plurality of areas in which a first area of each of the plurality of areas is an area to be focused on; and
   a movement unit that, when a focusing position of the lens is not successfully determined based on contrast evaluation values of the first area in the plurality of first frames;
      determines a direction for moving the area to be focused on from the first area to a second area of the plurality of areas, the movement unit being configured to determine the direction for moving the area to be focused on based on:
         a magnitude, of a contrast evaluation value of a sub-area of the first area, being larger than or equal to a given threshold in each piece of image data of the plurality of first frames or a plurality of second frames newly acquired by the acquisition unit; and
         a position of the sub-area within the first area with respect to a center portion of the first area such that the determined direction corresponds to the position of the sub-area with respect to the center portion of the first area; and
      moves the area to be focused on in the determined direction, the second area being in the determined direction from the first area such that the second area includes the area to be focused on.

2. The focus control device according to claim 1, further comprising an outdoor determination unit that, when the direction for moving the area to be focused on is not determined by the movement unit, determines whether or not image data of the area to be focused on is outdoor image data,
   wherein, when the outdoor determination unit determines that the image data of the area to be focused on is outdoor image data, the movement unit moves a position of the area to be focused on in a gravitational acceleration direction of a subject being imaged.

3. The focus control device according to claim 2, wherein, when the outdoor determination unit determines that the image data of the area to be focused on is not outdoor image data, the movement unit increases a size of the area to be focused on such that the area to be focused on is included in a plurality of the plurality of areas.

4. A non-transitory computer-readable recording medium having therein a program for causing a computer to execute a process for a focus control, the process comprising:
   acquiring image data of a plurality of first frames, each of the plurality of first frames having an image acquisition area captured by an image sensor, each of the plurality of first frames being captured at each of one of a plurality of positions of a lens in an optical axis direction, each of the plurality of positions being different each other, and each image acquisition area being divided into a plurality of areas in which a first area of each of the plurality of areas is an area to be focused on; and
   when a focusing position of the lens is not successfully determined based on contrast evaluation values of the first area in the plurality of first frames;
      determining a direction for moving the area to be focused on from the first area to a second area of the plurality of areas, the determining being based on;
         a magnitude, of a contrast evaluation value of a sub-area of the first area, being larger than or equal to a given threshold in each piece of image data of the plurality of first frames or a plurality of second frames newly acquired by the acquisition unit; and
         a position of the sub-area within the first area with respect to a center portion of the first area such that the determined direction corresponds to the position of the sub-area with respect to the center portion of the first area; and
      moving the area to be focused on in the determined direction, the second area being in the determined direction from the first area such that the second area includes the area to be focused on.

5. The non-transitory computer-readable recording medium having therein a program for causing a computer to execute a process for a focus control according to claim 4, wherein the process further comprises:
   when the direction for moving the area to be focused on is not determined, determining whether or not image data of the area to be focused on is outdoor image data, and
   when it is determined that the image data of the area to be focused on is outdoor image data, moving a position of the area to be focused on in a gravitational acceleration direction of a subject being imaged.

6. The non-transitory computer-readable recording medium having therein a program for causing a computer to execute a process for a focus control according to claim 5, wherein the process further comprises
   when it is determined that the image data of the area to be focused on is not outdoor image data, increasing a size of the area to be focused on such that the area to be focused on is included in a plurality of the plurality of areas.

7. A method for a focus control, the method comprising:
   acquiring, by a computer, image data of a plurality of first frames, each of the plurality of first frames having an image acquisition area captured by an image sensor, each of the plurality of first frames being captured at each of one of a plurality of positions of a lens in an optical axis direction, each of the plurality of positions being different each other, and each image acquisition area being divided into a plurality of areas in which a first area of each of the plurality of areas is an area to be focused on; and when a focusing position of the lens is not successfully determined based on contrast evaluation values of the first area in the plurality of first frames;
- determining a direction for moving the area to be focused on from the first area to a second area of the plurality of areas, the determining being based on;
  - a magnitude, of a contrast evaluation value of a sub-area of the first area, being larger than or equal to a given threshold in each piece of image data of the plurality of first frames or a plurality of second frames newly acquired by the acquisition unit; and
  - a position of the sub-area within the first area with respect to a center portion of the first area such that the determined direction corresponds to the position of the sub-area with respect to the center portion of the first area; and
- moving the area to be focused on in the determined direction, the second area being in the determined direction from the first area such that the second area includes the area to be focused on.

* * * * *